(12) United States Patent (10) Patent No.: US 8,565,047 B2
Wilson (45) Date of Patent: Oct. 22, 2013

(54) SYSTEMS AND METHODS FOR DATA WRITE LOOPBACK BASED TIMING CONTROL

(75) Inventor: Ross S. Wilson, Menlo Park, CA (US)

(73) Assignee: LSI Corporation, San Jose, CA (US)

( * ) Notice: Subject to any disclaimer, the term of this patent is extended or adjusted under 35 U.S.C. 154(b) by 257 days.

(21) Appl. No.: 13/096,873

(22) Filed: Apr. 28, 2011

(65) Prior Publication Data

US 2012/0275278 A1 Nov. 1, 2012

(51) Int. Cl.
*G11B 11/00* (2006.01)
*G11B 5/02* (2006.01)

(52) U.S. Cl.
USPC ............. 369/13.02; 360/59; 360/46; 360/31

(58) Field of Classification Search
USPC ............ 369/13.02, 47.28, 59.19; 360/46, 31, 360/51, 67, 68, 59
See application file for complete search history.

(56) References Cited

U.S. PATENT DOCUMENTS

| | | | |
|---|---|---|---|
| 3,973,182 A | 8/1976 | Kataoka | |
| 3,973,183 A | 8/1976 | Kataoka | |
| 4,024,571 A | 5/1977 | Dischert et al. | |
| 4,777,544 A | 10/1988 | Brown et al. | |
| 5,130,866 A | 7/1992 | Klaassen et al. | |
| 5,237,325 A | 8/1993 | Klein et al. | |
| 5,278,703 A | 1/1994 | Rub et al. | |
| 5,309,357 A | 5/1994 | Stark et al. | |
| 5,341,249 A | 8/1994 | Abbott et al. | |
| 5,377,058 A | 12/1994 | Good et al. | |
| 5,521,948 A | 5/1996 | Takeuchi | |
| 5,523,902 A | 6/1996 | Pederson | |
| 5,594,341 A | 1/1997 | Majidi-Ahy | |
| 5,668,679 A | 9/1997 | Swearingen et al. | |
| 5,696,639 A | 12/1997 | Spurbeck et al. | |
| 5,781,129 A | 7/1998 | Schwartz et al. | |
| 5,787,125 A | 7/1998 | Mittle | |
| 5,798,885 A | 8/1998 | Saiki et al. | |
| 5,835,295 A | 11/1998 | Behrens | |
| 5,844,920 A | 12/1998 | Zook et al. | |

(Continued)

FOREIGN PATENT DOCUMENTS

| | | |
|---|---|---|
| FR | 2904168 A1 | 1/2008 |
| WO | WO 03/047091 | 6/2003 |
| WO | WO 2008/009620 | 1/2008 |

OTHER PUBLICATIONS

U.S. Appl. No. 12/663,319, filed Dec. 7, 2009, Ratnakar Aravind.

(Continued)

*Primary Examiner* — Ali Neyzari
(74) *Attorney, Agent, or Firm* — Hamilton DeSanctis & Cha (57) ABSTRACT

Various embodiments of the present invention provide systems and methods for data writing. As an example, a heat assisted loopback circuit is discussed that includes: a read circuit, a magnetic write circuit, a heat write circuit, and a loopback circuit. The read circuit is operable to sense data from a storage medium, and to provide the sensed data as a read output. The magnetic write circuit is operable to provide a write output corresponding to an excitation signal of a write head. The heat write circuit is operable to provide a heat output corresponding to an excitation signal of a heat source. The loopback circuit is operable to selectively couple a derivative of the heat output to the read output and to selectively couple a derivative of the write output to the read output.

20 Claims, 8 Drawing Sheets

(56) References Cited

U.S. PATENT DOCUMENTS

| | | | |
|---|---|---|---|
| 5,852,524 A | 12/1998 | Glover et al. | |
| 5,892,632 A | 4/1999 | Behrens | |
| 5,955,783 A | 9/1999 | Ben-Efraim | |
| 5,970,104 A | 10/1999 | Zhong et al. | |
| 5,986,830 A | 11/1999 | Hein | |
| 5,987,562 A | 11/1999 | Glover | |
| 6,009,549 A | 12/1999 | Bliss et al. | |
| 6,023,383 A | 2/2000 | Glover et al. | |
| 6,069,583 A | 5/2000 | Silvestrin et al. | |
| 6,081,397 A | 6/2000 | Belser | |
| 6,111,712 A | 8/2000 | Vishakhadatta et al. | |
| 6,208,478 B1 | 3/2001 | Chiu et al. | |
| 6,269,058 B1 | 7/2001 | Yamanoi et al. | |
| 6,278,591 B1 | 8/2001 | Chang et al. | |
| 6,400,518 B1 | 6/2002 | Bhaumik et al. | |
| 6,404,829 B1 | 6/2002 | Sonu | |
| 6,411,452 B1 | 6/2002 | Cloke | |
| 6,441,661 B1 | 8/2002 | Aoki et al. | |
| 6,490,110 B2 | 12/2002 | Reed et al. | |
| 6,493,162 B1 | 12/2002 | Fredrickson | |
| 6,519,102 B1 | 2/2003 | Smith et al. | |
| 6,530,060 B1 | 3/2003 | Vis et al. | |
| 6,603,622 B1 | 8/2003 | Christiansen et al. | |
| 6,606,048 B1 | 8/2003 | Sutardja | |
| 6,633,447 B2 | 10/2003 | Franck et al. | |
| 6,646,822 B1 | 11/2003 | Tuttle et al. | |
| 6,657,802 B1 | 12/2003 | Ashley et al. | |
| 6,775,529 B1 | 8/2004 | Roo | |
| 6,788,484 B2 | 9/2004 | Honma | |
| 6,813,108 B2 | 11/2004 | Annampedu et al. | |
| 6,816,328 B2 | 11/2004 | Rae | |
| 6,839,014 B2 | 1/2005 | Uda | |
| 6,856,183 B2 | 2/2005 | Annampedu | |
| 6,876,511 B2 | 4/2005 | Koyanagi | |
| 6,912,099 B2 | 6/2005 | Annampedu et al. | |
| 6,963,521 B2 | 11/2005 | Hayashi | |
| 6,999,257 B2 | 2/2006 | Takeo | |
| 6,999,264 B2 | 2/2006 | Ehrlich | |
| 7,002,761 B1 | 2/2006 | Sutardja et al. | |
| 7,002,767 B2 | 2/2006 | Annampedu et al. | |
| 7,038,875 B2 | 5/2006 | Lou et al. | |
| 7,054,088 B2 | 5/2006 | Yamazaki et al. | |
| 7,072,137 B2 | 7/2006 | Chiba | |
| 7,082,005 B2 | 7/2006 | Annampedu et al. | |
| 7,092,462 B2 | 8/2006 | Annampedu et al. | |
| 7,116,504 B1 | 10/2006 | Oberg | |
| 7,126,776 B1 | 10/2006 | Warren, Jr. et al. | |
| 7,136,250 B1 | 11/2006 | Wu et al. | |
| 7,154,689 B1 | 12/2006 | Shepherd et al. | |
| 7,167,328 B2 | 1/2007 | Annampedu et al. | |
| 7,180,693 B2 | 2/2007 | Annampedu et al. | |
| 7,187,739 B2 | 3/2007 | Ma | |
| 7,191,382 B2 | 3/2007 | James et al. | |
| 7,193,544 B1 | 3/2007 | Fitelson et al. | |
| 7,193,798 B2 | 3/2007 | Byrd et al. | |
| 7,199,961 B1 | 4/2007 | Wu et al. | |
| 7,203,013 B1 | 4/2007 | Han et al. | |
| 7,206,146 B2 | 4/2007 | Flynn et al. | |
| 7,230,789 B1 | 6/2007 | Brunnett et al. | |
| 7,248,425 B2 | 7/2007 | Byun et al. | |
| 7,253,984 B1 | 8/2007 | Patapoutian et al. | |
| 7,265,937 B1 | 9/2007 | Erden et al. | |
| 7,286,313 B2 | 10/2007 | Erden et al. | |
| 7,301,717 B1 | 11/2007 | Lee et al. | |
| 7,308,057 B1 | 12/2007 | Patapoutian | |
| 7,323,916 B1 | 1/2008 | Sidiropoulos et al. | |
| 7,362,536 B1 | 4/2008 | Liu et al. | |
| 7,375,918 B1 | 5/2008 | Shepherd et al. | |
| 7,411,531 B2 | 8/2008 | Aziz et al. | |
| 7,420,498 B2 | 9/2008 | Barrenscheen | |
| 7,423,827 B2 | 9/2008 | Neville et al. | |
| 7,446,690 B2 | 11/2008 | Kao | |
| 7,499,238 B2 | 3/2009 | Annampedu | |
| 7,525,460 B1 | 4/2009 | Liu et al. | |
| 7,529,320 B2 | 5/2009 | Byrne et al. | |
| 7,558,177 B2 | 7/2009 | Ogura et al. | |
| 7,602,568 B1 | 10/2009 | Katchmart | |
| 7,616,395 B2 | 11/2009 | Yamamoto | |
| 7,620,101 B1 | 11/2009 | Jenkins | |
| 7,630,155 B2 | 12/2009 | Maruyama et al. | |
| 8,077,415 B1 * | 12/2011 | Sutardja | 360/46 |
| 8,169,726 B2 * | 5/2012 | Wilson | 360/46 |
| 8,315,128 B1 * | 11/2012 | Wilson et al. | 369/13.02 |
| 8,379,341 B1 * | 2/2013 | Sutardja | 360/46 |
| 2002/0001151 A1 | 1/2002 | Lake | |
| 2002/0150179 A1 | 10/2002 | Leis et al. | |
| 2002/0176185 A1 | 11/2002 | Fayeulle et al. | |
| 2002/0181377 A1 | 12/2002 | Nagata et al. | |
| 2003/0090971 A1 | 5/2003 | Gushima et al. | |
| 2003/0095350 A1 | 5/2003 | Annampedu et al. | |
| 2004/0179460 A1 | 9/2004 | Furumiya et al. | |
| 2005/0046982 A1 | 3/2005 | Liu et al. | |
| 2005/0157415 A1 | 7/2005 | Chiang et al. | |
| 2005/0243455 A1 | 11/2005 | Annampedu | |
| 2007/0064847 A1 | 3/2007 | Gaedke et al. | |
| 2007/0071152 A1 | 3/2007 | Chen et al. | |
| 2007/0103805 A1 | 5/2007 | Hayashi et al. | |
| 2007/0104300 A1 | 5/2007 | Esumi et al. | |
| 2007/0183073 A1 | 8/2007 | Sutardja et al. | |
| 2007/0230015 A1 | 10/2007 | Yamashita et al. | |
| 2007/0263311 A1 | 11/2007 | Smith | |
| 2007/0280059 A1 | 12/2007 | Cheng et al. | |
| 2008/0056403 A1 | 3/2008 | Wilson | |
| 2008/0080082 A1 | 4/2008 | Erden et al. | |
| 2008/0212715 A1 | 9/2008 | Chang | |
| 2008/0266693 A1 | 10/2008 | Bliss et al. | |
| 2009/0002862 A1 | 1/2009 | Park et al. | |
| 2009/0142620 A1 | 6/2009 | Yamamoto et al. | |
| 2009/0245448 A1 | 10/2009 | Ran et al. | |
| 2009/0274247 A1 | 11/2009 | Galbraith et al. | |

OTHER PUBLICATIONS

U.S. Appl. No. 12/838,601, filed Aug. 19, 2010, Wilson, Ross.
U.S. Appl. No. 12/851,475, filed Aug. 5, 2010, Annampedu, Viswanath.
U.S. Appl. No. 12/877,327, filed Sep. 21, 2010, Llu et al.
U.S. Appl. No. 12/894,221, filed Sep. 30, 2010, Yang et al.
U.S. Appl. No. 12/946,048, filed Nov. 15, 2010, Yang et al.
U.S. Appl. No. 12/947,962, filed Nov. 17, 2010, Liu et al.
U.S. Appl. No. 12/946,033, filed Nov. 15, 2010, Yang et al.
U.S. Appl. No. 12/955,789, filed Nov. 29, 2010, Annampedu et al.
U.S. Appl. No. 12/955,821, filed Nov. 29, 2010, Annampedu et al.
U.S. Appl. No. 12/972,904, filed Dec. 20, 2010, Viswanath Annampedu.
U.S. Appl. No. 13/100,021, filed May 3, 2011, Xia, Haitao et al.
U.S. Appl. No. 13/113,210, filed May 23, 2011, Zhang, Xun et al.
U.S. Appl. No. 13/014,754, filed Jan. 27, 2011, Viswanath Annampedu.
U.S. Appl. No. 13/009,067, filed Jan. 19, 2011, Zhang, Xun et al.
U.S. Appl. No. 13/050,048, filed Mar. 17, 2011, Xia, Haitao et al.
U.S. Appl. No. 13/096,873, filed Apr. 28, 2011, Wilson, Ross S.
U.S. Appl. No. 13/173,088, filed Jun. 30, 2011, Grundvig, et al.
U.S. Appl. No. 13/186,267, filed Jul. 19, 2011, Xia, Haitao et al.
Annampedu, V. et al, "Adaptive Algorithms for Asynchronous Detection of Coded Servo Signals Based on Interpolation", IEEE Transactions on Magnetics, vol. 41, No. 10, Oct. 2005.
Aziz and Annampedu, "Asynchronous Maximum Likelihood (ML) Detection of Servo repeatable Run Out (RRO) Data" Magnetics Conf. IEEE International May 2006.
Aziz et al "Interpolation Based Maximum-Likelihood(ML) Detection of Asynchronous Servo Repeatable Run Out (RRO) Data", Digest, IEEE Intl Magnetics Conf. vol. 42, No. 10 Oct. 2006.
Kryder, M. et al "Heat Assisted Magnetic Recording" Proc. IEEE, vol. 96, No. 11, p. 1810, Nov. 2008.
Weller et al "Thermal Limits in Ultrahigh-density Magnetic Recording" IEEE Trans. Magn. vol. 35, No. 6, p. 4423, Nov. 1999.

* cited by examiner

SYSTEMS AND METHODS FOR DATA WRITE LOOPBACK BASED TIMING CONTROL

BACKGROUND OF THE INVENTION

The present inventions are related to systems and methods for writing data to a storage medium.

In conventional recording systems there is a tradeoff between the longevity of data stored to a storage medium and the writeability of the storage medium. Small grain size is required for high-density recording. Such small grain size renders the stored data more susceptible to thermal agitation resulting in destruction of the magnetization representing the stored data. In some cases, medium coercivity is increased to mitigate the aforementioned effect of thermal agitation, but such an increase in coercivity has not proven able to surpass values magnetizable by about two Tesla flux densities, a limit imposed by the saturation magnetization of the soft magnetic materials of which the write head is fabricated.

Use of heat-assisted magnetic recording addresses the writeability versus longevity dilemma by locally heating the storage medium during writing to near its Curie temperature allowing magnetization by existing write head designs relying on achievable flux densities. In some cases, the heating is done using a concentrated laser beam typically of 800 nm-1000 nm wavelength; beam concentration below the diffraction limit is typically achieved using near-field techniques based on plasmon resonance. Such an approach is more fully described in D. Weller et al., "Thermal Limits in Ultrahigh-Density magnetic Recording", IEEE Trans. Magn., Vol. 35, No. 6, p. 4423, Nov. 1999. The entirety of the aforementioned reference is incorporated herein by reference for all purposes. While such an approach offers promise of improved data storage devices and systems, current control of the laser in relation to other write circuitry has been insufficient to yield commercially viable systems.

Hence, for at least the aforementioned reasons, there exists a need in the art for advanced systems and methods for control of the laser relative to other write circuitry.

BRIEF SUMMARY OF THE INVENTION

The present inventions are related to systems and methods for writing data to a storage medium.

Some embodiments of the present invention provide methods for performing phase alignment in a recording channel. Such methods include: coupling a write output to a read data; determining a first delay from the write output to the read data; coupling a heat output to the read data; determining a second delay from the heat output to the read data; calculating a phase delay value corresponding to a difference between the first delay and the second delay; and modifying a heat data path providing the heat output to delay the heat output by an amount corresponding to the phase delay value. In some instances of the aforementioned embodiments, the methods further include: providing a write head operable to magnetize a storage medium, and providing a heat source operable to heat the storage medium. In such instances, a derivative of the write output is operable to excite the write head, and a derivative of the heat output is operable to excite the heat source.

In one or more instances of the aforementioned embodiments, determining the first delay from the write output to the read data includes: writing a pattern via a write data input; detecting the pattern in the read data; and determining a delay between a first time corresponding to when the pattern is written via the write data input and a second time corresponding to when the pattern is detected in the read data. In some cases, the pattern is a 2T pattern. In some such instances, determining the second delay from the heat output to the read data includes: writing a pattern via a write data input; detecting the pattern in the read data; and determining a delay between a first time corresponding to when the pattern is written via the write data input and a second time corresponding to when the pattern is detected in the read data.

Various embodiments of the present invention provide heat assisted loopback circuits. Such heat assisted loopback circuits include: a read circuit, a magnetic write circuit, a heat write circuit, and a loopback circuit. The read circuit is operable to sense data from a storage medium, and to provide the sensed data as a read output. The magnetic write circuit is operable to provide a write output corresponding to an excitation signal of a write head. The heat write circuit is operable to provide a heat output corresponding to an excitation signal of a heat source. The loopback circuit is operable to selectively couple a derivative of the heat output to the read output and to selectively couple a derivative of the write output to the read output.

In some instances of the aforementioned embodiments, the loopback circuit includes a variable gain element that is operable to provide a variable current output to an output buffer. In some cases, the variable current output varies based at least in part on the write output when the derivative of the write output is selectively coupled to the read output by the loopback circuit. In such cases, the derivative of the write output is the variable current output. In other cases, the variable current output varies based at least in part on the heat output when the derivative of the heat output is selectively coupled to the read output by the loopback circuit. In such cases, the derivative of the heat output is the variable current output. In one or more instances of the aforementioned embodiments, the loopback circuit includes: a variable gain element operable to provide a variable current output to an output buffer; and a selector circuit operable to connect at least one of the heat output and the write output to the variable gain element. In particular instances of the aforementioned embodiments, the variable gain element includes a current routing long tailed pair.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for writing data to a storage medium.

Heat-assisted magnetic recording and bit-patterned magnetic recording are two techniques offering promise of raising raise magnetic recording areal densities to approximately four terabytes per square inch, and together the promise of approximately ten terabytes per square inch. Both of the aforementioned recording methods demand a close timing match between disparate signal channels (e.g., a magnetic write path and a laser write path).

In heat-assisted magnetic recording, a heat source is pulsed in a controlled phase relationship with a write current provided to a magnetic recording head. In some cases, the heat source is a diode laser that illuminates the surface of a storage medium local to the write head. In bit-patterned magnetic recording, write current transitions must be aligned closely with lithographically deposited single-domain islands on the record medium. The write current is produced by a magnetic data write path and the heat source pulse is produced by a laser data write path. Both the magnetic data write path and the laser data write path may be part of a write portion of a recording channel. The write current and the heat source pulse are provided to a read/write head assembly disposed near the surface of a storage medium. The read/write head assembly includes a write head that is excited by the write current, and a heat source excited by the heat source pulse. In some cases, the write current and the heat source pulse are provided to the read/write head assembly through flexible transmission lines, receiving circuits, and high-power driver amplifier circuits. Transport delay and skew through the magnetic data write path and the laser data write path is affected by temperature and humidity and by the dissimilar driver and encoding circuitry.

In bit-patterned magnetic recording, propagation delay shifts through both a read head and the write head affect transition alignment to bit lands unless the shifts are calibrated out. Some embodiments of the present invention provide the means to establish a specified time relationship between the write current produced by the magnetic data write path and the heat source pulse produced by the laser data write path for heat-assisted magnetic recording or for a combined heat-assisted magnetic recording and bit-patterned magnetic recording system. Various embodiments of the present invention may be used in relation to circuitry described in U.S. patent application Ser. No. 12/838,601 entitled "Disk File Preamplifier Frequency-Response and Time Delay Compensation", and filed by Ross Jul. 19, 2010. The entirety of the aforementioned reference is incorporated herein by reference for all purposes.

Figure 1:
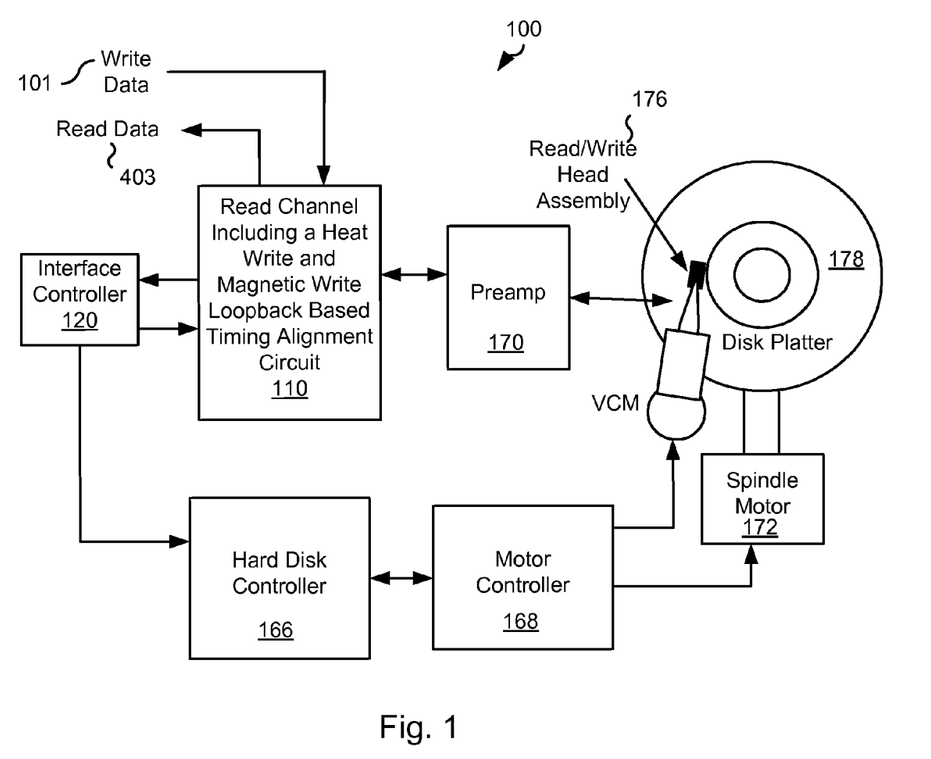
FIG. 1 depicts a storage system including a read channel circuit with heat write and magnetic write loopback based timing alignment circuit in accordance with some embodiments of the present invention.

Turning to FIG. 1, a data storage system 100 is shown that may be, for example, a hard disk drive. Data storage system 100 includes a read channel circuit 110 having a heat write and magnetic write loopback based timing alignment circuit in accordance with various embodiments of the present invention. The heat write and magnetic write loopback based timing alignment circuit includes an ability to control the phase alignment of a heat source and a magnetic source in a read/write head assembly 176. In some embodiments, the heat source is a laser. In one particular embodiment of the present invention, the laser is a JDS Uniphase 50 mW 830 nm diode. Such loopback based timing alignment control enhances the write effectiveness of read/write head assembly as it writes information to a disk platter 178. Disc platter 178 may be fabricated with a continuous magnetic-recording layer, or in the case of BPMR (Bit Patterned Media Recording), with a layer having discrete magnetic islands each corresponding to a single bit. Based upon the disclosure provided herein, one of ordinary skill in the art will recognize a variety of constructions that may be used for disk platter 178. It should be noted that data storage system 100 may include many disk platters with one or more read/write head assemblies associated with each disk platter. As just one example, data storage system 100 may include four disk platters and eight read/write head assemblies respectively associated with each of the eight storage surfaces of the four disk platters. Based upon the disclosure provided herein, one of ordinary skill in the art will recognize a variety of number of disk platters and read/writer head assemblies, and configurations thereof that may be used in relation to different embodiments of the present invention.

Data storage system 100 also includes a preamplifier 170, an interface controller 120, a hard disk controller 166, a motor controller 168, and a spindle motor 172. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical write operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly 178 to the proper data track on disk platter 178 under the direction of hard disk controller 166. Spindle motor 172 spins disk platter 178 at a determined spin rate (RPMs). Once read/write head assembly 178 is positioned adjacent the proper data track, a magnetic field is generated in read/write head assembly causing the surface of disk platter to be magnetized with a field corresponding to a write data 101 input (after encoding and processing by read channel circuit 110). At the same time, the area on disk platter 178 where the data is to be written is heated using a heat source to allow for enhanced writeability. In a read process, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. The heat source and magnetic source may be phase aligned or phase offset in a controlled manner using write circuitry similar to that discussed below in relation to FIGS. 2-5, and/or methods consistent with that discussed below in relation to FIG. 6.

It should be noted that storage system 100 may be integrated into a larger storage system such as, for example, a RAID (redundant array of inexpensive disks or redundant array of independent disks) based storage system. It should also be noted that various functions or blocks of storage system 100 may be implemented in either software or firmware, while other functions or blocks are implemented in hardware.

Figure 2:
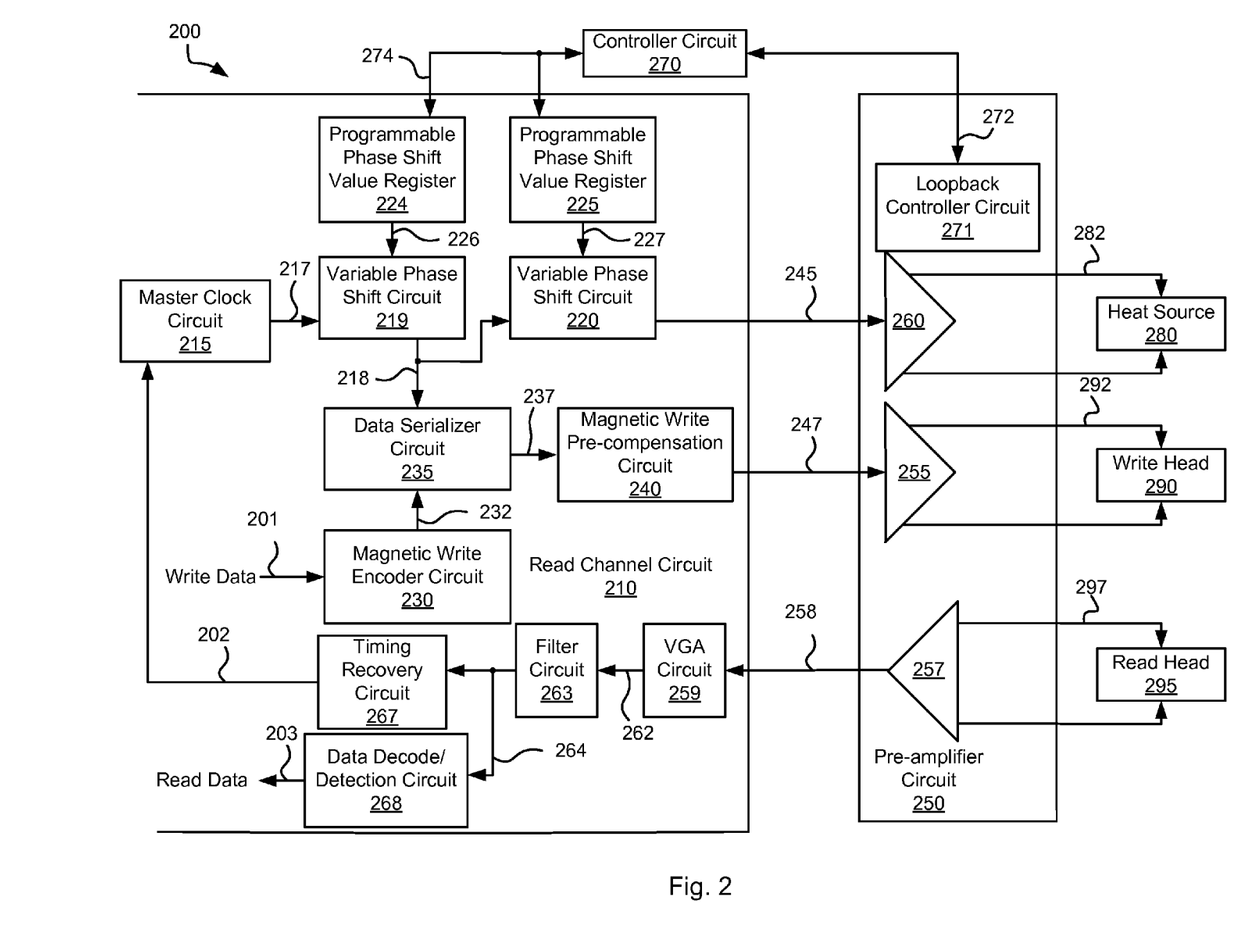
FIG. 2 depicts a portion of a combination bit pattern magnetic and heat assisted magnetic recording system in accordance with one or more embodiments of the present invention.

Turning to FIG. 2, a circuit portion 200 is shown in accordance with some embodiments of the present invention that includes elements of a read channel circuit 210, preamplifier circuit 250, a heat source 280, a write head 290 and a read head 295. In some implementations, heat source 280, write head 290 and read head 295 are included in a common read/write head assembly that may be disposed in close proximity to a storage medium (not shown). Write head 290 may be any circuit or device known in the art that is capable of generating a magnetic field sufficiently large to magnetize a defined region of the storage medium. As just one example, write head 290 may be a magneto-resistive (MR) write head as are known in the art. Based upon the disclosure provided herein, one of ordinary skill in the art will recognize a variety of write heads that may be used in relation to different embodiments of the present invention. In some embodiments of the present invention, heat source 280 is a laser as is known in the art. When excited, the laser generates heat at the defined location where a write is occurring. Based upon the disclosure provided herein, one of ordinary skill in the art will recognize a variety of heat sources including, but not limited to, specific types of lasers that may be used in relation to different embodiments of the present invention. Read head 295 may be any circuit or device known in the art that is capable of sensing a magnetic field from information previously stored to a storage medium.

A controller circuit 270 is included that provides control signals 274 to read channel circuit 210 and control signals 272 to a loopback controller circuit 271 of preamplifier circuit 250. Control circuit 270 may be any circuit capable of providing control to the operations of circuit portion 200, and for determining a phase offset between read data 203 and write data 201. In some embodiments of the present invention, control circuit 270 includes a microcontroller that executes firmware as are known in the art. Based upon the disclosure provided herein, one of ordinary skill in the art will recognize a variety of control circuits that may be used in relation to different embodiments of the present invention.

Read channel circuit 210 includes a master clock circuit 215 that generates a clock signal 217 to which write operations are synchronized. In some cases, the phase and frequency of clock signal 217 are adjusted by master clock circuit 215 based upon timing recovery data 202 from a timing recovery circuit 267. Timing recovery circuit 267 receives read data derived from read head 295. In particular, read head 295 senses magnetic information from a storage medium and provides a read signal 297 to a receiver/amplifier circuit 257 within preamplifier circuit 250. Receiver/amplifier circuit 257 amplifies the received read data and provides a corresponding amplified read signal 258 to read channel circuit 210. Amplified read signal 258 is amplified by a variable gain amplifier circuit 259, and a variable gain amplified signal 262 is provided to a filter circuit 263. Variable gain amplifier circuit 263 may be any circuit known in the art that is capable of applying a variable gain to a received analog signal. Filter circuit 263 filters the received input and provides a corresponding filtered output 264. Filter circuit 263 may be any circuit known in the art that is capable of filtering a received analog signal. Timing recovery circuit 267 uses filtered output 264 to recover timing information related to the data read from the storage medium. Timing recovery circuit 267 may be any circuit known in the art that is capable of recovering timing from a received data set. The recovered timing information is then provided to master clock circuit 215 as timing recovery data 202. Based upon the disclosure provided herein, one of ordinary skill in the art will recognize a variety of clock circuits and timing recovery circuits that may be used in relation to different embodiments of the present invention.

Filtered output 264 is also provided to a data decoder/detection circuit 268. Data decoder/detection circuit 268 may be any circuit known in the art that is capable of receiving an encoded analog stream in digital format and recovering the originally written data set. In some embodiments of the present invention, data decoder/detection circuit 268 includes one or more pairs of data detector and data decoders. Upon processing filtered output 264, data decoder/detection circuit 268 and timing recovery circuit 267 may share certain elements, for example, analog to digital conversion and adaptive equalization. Data decoder/detection circuit 268 yields the original data set which is provided as read data 203. Based upon the disclosure provided herein, one of ordinary skill in the art will recognize a variety of data processing circuits that may be used in place of data decoder/detection circuit in accordance with the various embodiments of the present invention.

Write data 201 destined for storage to the storage medium may be received from an upstream source (not shown). Such write data may be received as a series of WORDS which each contain a number of individual bits. Such WORDS may be, for example, thirty-two bit words, sixty-four bit words, or one hundred, twenty-eight bit words. Based upon the disclosure provided herein, one of ordinary skill in the art will recognize a variety of sources from which write data 201 may be received, and a number of formats that write data 201 may exhibit. Write data 201 is received by a magnetic write encoder circuit 230 and encoded in preparation for writing as magnetic information on a storage medium. The resulting data is provided as encoded data 232 to a data serializer circuit 235. Magnetic write encoder circuit 230 may be any circuit known in the art that receives data and encodes that data in preparation for writing as magnetic information to a storage medium. Data serializer circuit 235 accepts parallel encoded data 232 at an input clock rate, and provides a serial data stream 237 at an output clock rate. As an example, where encoded data is received eight bits at a time, serial data stream 237 may be provided at eight times the rate of the input clock.

A clock 218 used by data serializer circuit 235 to synchronize the serialization process is provided by a variable phase shift circuit 219. Variable phase shift circuit 219 delays clock signal 217 by an amount corresponding to a phase delay value 226 from a programmable phase shift register 224. Of note, variable phase shift circuit 219 us used to support BPMR, but is not used for HAMR (Heat Activated Magnetic Recording). Variable phase shift circuit 219 may be implemented as a programmable phase interpolator. Based upon the disclosure provided herein, one of ordinary skill in the art will recognize a variety of implementations of delay circuits that may be used in relation to different embodiments of the present invention. Programmable phase shift register 224 is written by controller circuit 270 using control signals 274.

Serial data stream 237 is provided to a magnetic write pre-compensation circuit 240 that pre-compensates the received data and provides a pre-compensated write signal 247 to preamplifier circuit 250. It is customary to pre-compensate the magnetic write data signal to counteract the bit-shift effect of adjacent transition patterns, and magnetic write pre-compensation circuit 240 may be any circuit known in the art that is capable of pre-compensating a data input in preparation for writing to a storage medium. Of note, in some embodiments read channel circuit 210 and preamplifier circuit 250 are implemented in separate physical packages. In some such cases, pre-compensated write signal 247 is provided to preamplifier circuit 250 via a flexible connector. While it is not shown, in some embodiments of the present invention, heat data may also be pre-compensated. In such cases, read channel circuit 210 would additionally include a heat data pre compensation circuit.

In addition, phase shifted clock 218 from variable phase shift circuit 219 is applied also to a second variable phase shift circuit 220 that operates to deliver variably-phase-shifted heat control clock 245 to the preamplifier. This applied phase delay operates to modify the relative alignment of heat write signal 245 and pre-compensated write signal 247 in accordance with the following equation:

Phase Offset=$\phi_{Heat\ Write\ Signal}-\phi_{Pre-Compensated\ Write\ Signal}$, where $\phi_{Heat\ Write\ Signal}$ is the phase of heat write signal 245 and $\phi_{Pre-Compensated\ Write\ Signal}$ is the phase of pre-compensated write signal 247. Of note, as depicted only a positive phase shift is possible as variable phase shift circuit 220 only applies a phase delay to serial data stream 237. However, in some embodiments of the present invention, magnetic write pre-compensation circuit 240 applies a fixed delay to serial data stream 237 as part of generating pre-compensated write signal 247. As such, where variable phase shift circuit 220 applies a phase delay less than the fixed delay applied by magnetic write pre-compensation circuit 240, an effective negative delay can be applied to heat write signal 245 in accordance with the following equation:

Phase Offset=$\phi_{Heat\ Write\ Signal}-\phi_{Pre-Compensated\ Write\ Signal}+\phi_{Fixed}$, where $\phi_{Fixed}$ is the fixed delay applied by magnetic write pre-compensation circuit 240. Phase delay value 227 is written to a programmable phase shift value register 225 by controller circuit 270 as part of a calibration process that is more fully described below.

Variable phase shift circuit 220 may be implemented as a programmable phase interpolator. It should also be noted that the variable delay implemented by variable phase shift circuit 220 may instead be implemented as delay cells within preamplifier circuit 250. In some cases, the delay cells are programmably variable. Based upon the disclosure provided herein, one of ordinary skill in the art will recognize a variety of implementations of delay circuits that may be used in relation to different embodiments of the present invention.

Although FIG. 2 shows distinct heat and magnetic write data signals, one or both may be multiplexed onto other preamplifier pins, to conserve flex and die area. Preamplifier circuit 250 includes a loopback control circuit 271 that is operable to control the aforementioned calibration process. An output driver 260 receives heat write signal 245 and provides a corresponding differential excitation signal 282 (of note, the excitation signal may be single ended) to heat source 280; and an output driver 255 receives pre-compensated write signal 247 and provides a corresponding differential excitation signal 292 to write head 290. To assure accommodation of as many potential path differences between exciting heat source 280 and exciting write head 290, it is beneficial to determine the phase difference between differential excitation signal 292 and differential excitation signal 282 close to heat source 280 and write head 290. Thus, in some embodiments of the present invention, a series of output drivers may be used in place of output driver 255 and output driver 260 with a final stage output driver driving the respective differential excitation signal 292 and differential excitation signal 282 (again, the excitation signal may be single ended) and a prior output driver providing the respective interim signal 256 and interim signal 261 to detect the phase offset by phase control circuit 271.

Where heat source 280 is a laser and heat write signal 245 is used to stimulate the laser, properly phased laser illumination of the medium relative to the transitions of a magnetic field generated by write head 280 enhances storage capability. The transition gradient is a function of rates-of-change both of a differential excitation signal 292 to write head 290 and the temperature (T) of the storage medium local to the write area in accordance with the following equation:

$$\frac{dH_{Total}}{dx} = \frac{dH_{Write}}{dx} + \frac{dH_c}{dT} \times \frac{dT}{dx}.$$

Multiplying through by velocity $$\left(\frac{dx}{dt}\right)$$

yields a time-dependent equation describing the effect of temporal shift between magnetic excitations (corresponding to differential excitation signal 292) and thermal excitations (corresponding to differential excitation signal 282). Independent of the areal-density benefits secured by precise phasing of the heat and magnetic signals, pulsing the heat source results in lower slider temperature hence improved reliability.

It should be noted that while the magnetic data path (i.e., the path from write data 201 to serial data stream 237 may be bifurcated to include a separate path from write data 201 to variable phase shift circuit 220 and from write data 201 to magnetic write pre-compensation circuit 240. For example, the data provided as heat write signal 245 may be encoded and serialized, possibly using a code different from that used in the magnetic channel such as, by controlling the heat source by a variable-duty-cycle clock of bit rate frequency.

The support provided in circuit portion 200 for bit-patterned magnetic recording include the read data path yielding timing recovery data 202 and master clock circuit 215 that closely locks a write clock to read servo data and/or special island-timing information pre-recorded on the medium. Additionally, the support includes variable phase shift circuit 219 and programmable phase shift value register 224 that together operate to phase the written transitions properly relative to the bit patterned magnetic recording lands on the storage medium. In contrast, where heat assisted magnetic recording is used alone the clock from master clock circuit may be free running or a clock only loosely referenced to servo data retrieved using read head 295.

Figure 3:
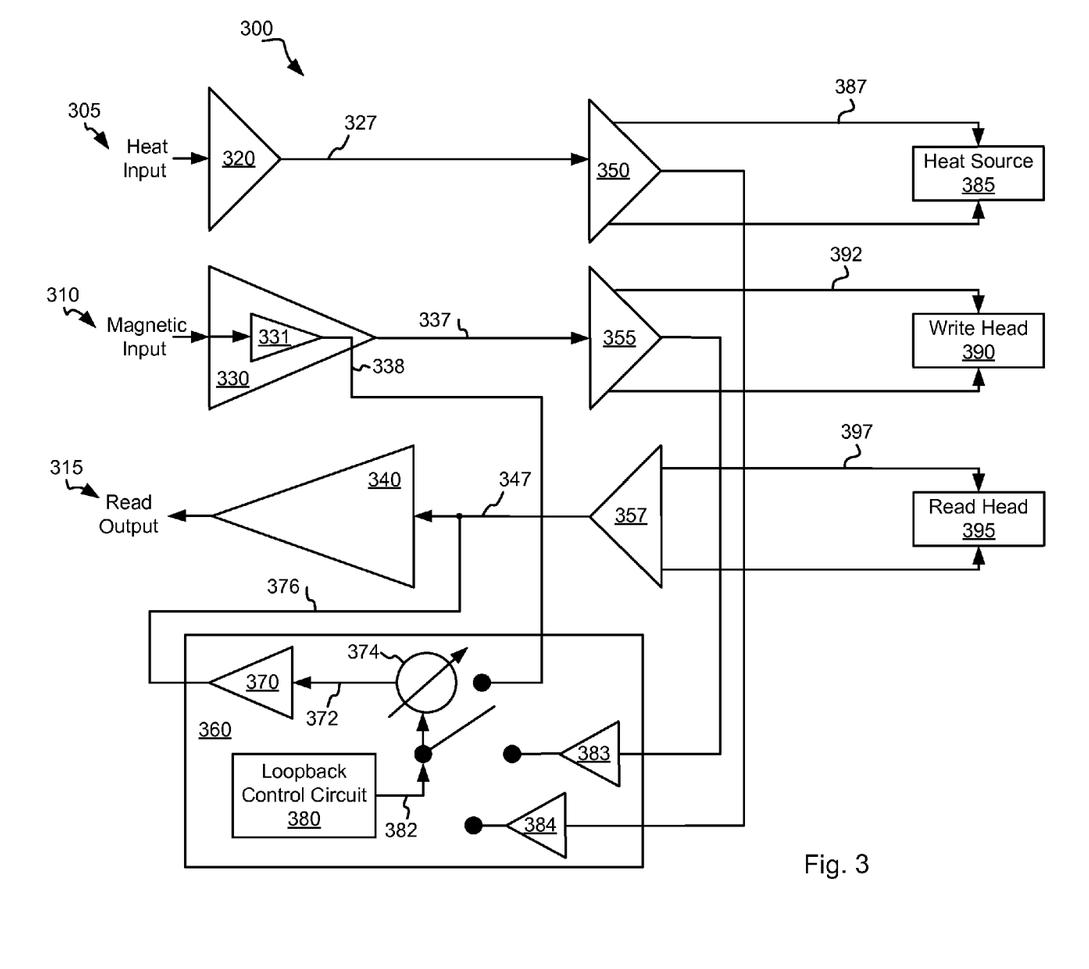
FIG. 3 shows a preamplifier circuit in accordance with some embodiments of the present invention that relies on a loopback cell operable to control phase alignment of the various signals involved in writing a storage medium.

Turning to FIG. 3, a preamplifier circuit 300 is shown that relies on a loopback cell operable to control phase alignment of the various signals involved in writing a storage medium. Preamplifier circuit 300 includes an input receiver 320 receiving a heat input 305 and providing a corresponding output 327 to an output driver 350. Output driver 350 provides a corresponding differential excitation signal 387 to a heat source 380. In some cases, heat source 380 is a pulsed laser. An input receiver circuit 330 receives a magnetic input 310 and provides a corresponding output 337 to an output driver 355. Output driver 355 provides a corresponding differential excitation signal 392 to a write head 390. Receiver 330 includes an internal receiver 331 providing an interim drive signal 338 that closely mimics output 337. In some embodiments of the present invention, internal receiver 331 is implemented using positive emitter coupled logic (PECL). In addition, preamplifier circuit 300 includes a read data receiver 357 operable to receive a read signal 397 from a read head 395. Receiver 357 drives read signal 397 as an output 347 to an output driver 340 that in turn provides a read output 315.

Interim drive signal 338, an output corresponding to excitation signal 392 (via an input buffer 383), and an output corresponding to excitation signal 387 (via an input buffer 384) are provided to a loopback circuit 360 that is operable to provide an injection signal 376 that is added to the read path. Loopback circuit 360 includes a loopback control circuit 380 that selects which of interim drive signal 338, the output corresponding to excitation signal 392 or the output corresponding to excitation signal 387 drives a variable gain element 374. More particularly, loopback control circuit 380 asserts a selector signal 382 causing one of the aforementioned signals to be applied to variable gain element 374. In some embodiments of the present invention, selection between the three sources is done using a selector circuit as are known in the art. In one particular embodiment of the present invention, variable gain element 374 may be implemented as a current switch that provides a variable amplitude current mode differential signal 372 to drive an output buffer 370. The amount of gain may be programmably varied to assure that read output 315 remains in a linear regime over all of its gain settings. In one example, variable gain element 374 may be implemented using conventional techniques, such as, for example, using a current-routing long-tailed pair having a programmable variable tail current source. Output buffer 370 provides injection signal 376 to output 347. This augmentation of injection signal 376 with output 347 may be done simply by tying two signal lines together and enabling the corresponding source (block 357 or 370), or may be done by using a driver circuit (not shown) internal to output driver 340. In some embodiments of the present invention, output buffer 370 is added effectively in parallel to read data receiver 357, and configured such that injection signal 376 may be selected under user control in lieu of output 347 from read data receiver 357. In similar fashion, input buffer 383 is effectively in parallel with output driver 350, and input buffer 384 is effectively in parallel with output driver 355.

In operation, interim drive signal 338 may be chosen by loopback control circuit 380 when loopback correction is performed for fly-height measurement. One example of such fly-height measurement is disclosed in U.S. patent application Ser. No. 12/838,601 entitled "Disk File Preamplifier Frequency-Response and Time Delay Compensation", and filed by Ross Jul. 19, 2010. The entirety of the aforementioned reference was previously incorporated herein by reference for all purposes. Alternatively, when loopback correction is provided for time delay compensation in bit patterned magnetic recording to change the phase offset applied by variable phase shift circuit 219 of FIG. 2, the output corresponding to excitation signal 392 is selected by loopback control circuit 380. As yet another alternative, when loopback correction is provided for time delay compensation in heat assisted magnetic recording to change the phase offset applied by variable phase shift circuit 220 of FIG. 2, the output corresponding to excitation signal 387 is selected by loopback control circuit 380. The frequency response of the selector circuit controlled by loopback control circuit 380 should be flat to beyond the desired test frequencies.

In general, including the write loopback driver 166 in the loopback excitation path is undesirable during fly-height loopback compensation calibration, as pulse asymmetries may affect the extracted loopback harmonic amplitudes. For bit patterned magnetic recording, the additional input buffer 383 is included in the loopback excitation path. Input buffer 383 generally mimics the operation of the normal output driver 355, albeit at lower internal swings, while preserving the time-delay versus temperature properties of the normal output driver 355. In this way, a bit patterned magnetic loopback operation may measure delay from the write data path from magnetic input 310 to read output 315. Whenever fly-height correction loopback is active, output driver 355 may be disabled to prevent inadvertent writing on the storage medium (not shown). In some cases during bit patterned magnetic loopback, output driver 355 may be disabled, while in other cases output driver 355 may remain active to allow dynamic correction of write clock phasing during a write operation. For heat assisted magnetic recording, the additional input buffer 384 is included in the loopback excitation path. Buffer 384 generally mimics the operation of the normal output driver 350, albeit at lower internal swings, while preserving the time-delay versus temperature properties of the normal output driver 350. In some cases, the signals of output driver 350 and output driver 355 are tapped off as near as possible to heat source 385 and write head 390, respectively. In this way, a heat assisted magnetic loopback operation may measure delay from the write data path from magnetic input 310 to excitation signal 387. Whenever fly-height correction loopback is active, output driver 355 and output driver 350 may be disabled to prevent inadvertent writing on the storage medium (not shown). In some cases during bit patterned magnetic loopback, output driver 355 and output driver 350 may be disabled, while in other cases output driver 355 and output driver 350 may remain active to allow dynamic correction of write clock phasing during a write operation. It should be noted that preamplifier circuit 300 may service a number of read/write head assemblies (i.e., more than one of each of heat source 385, write head 390 and read head 395).

Figure 4:
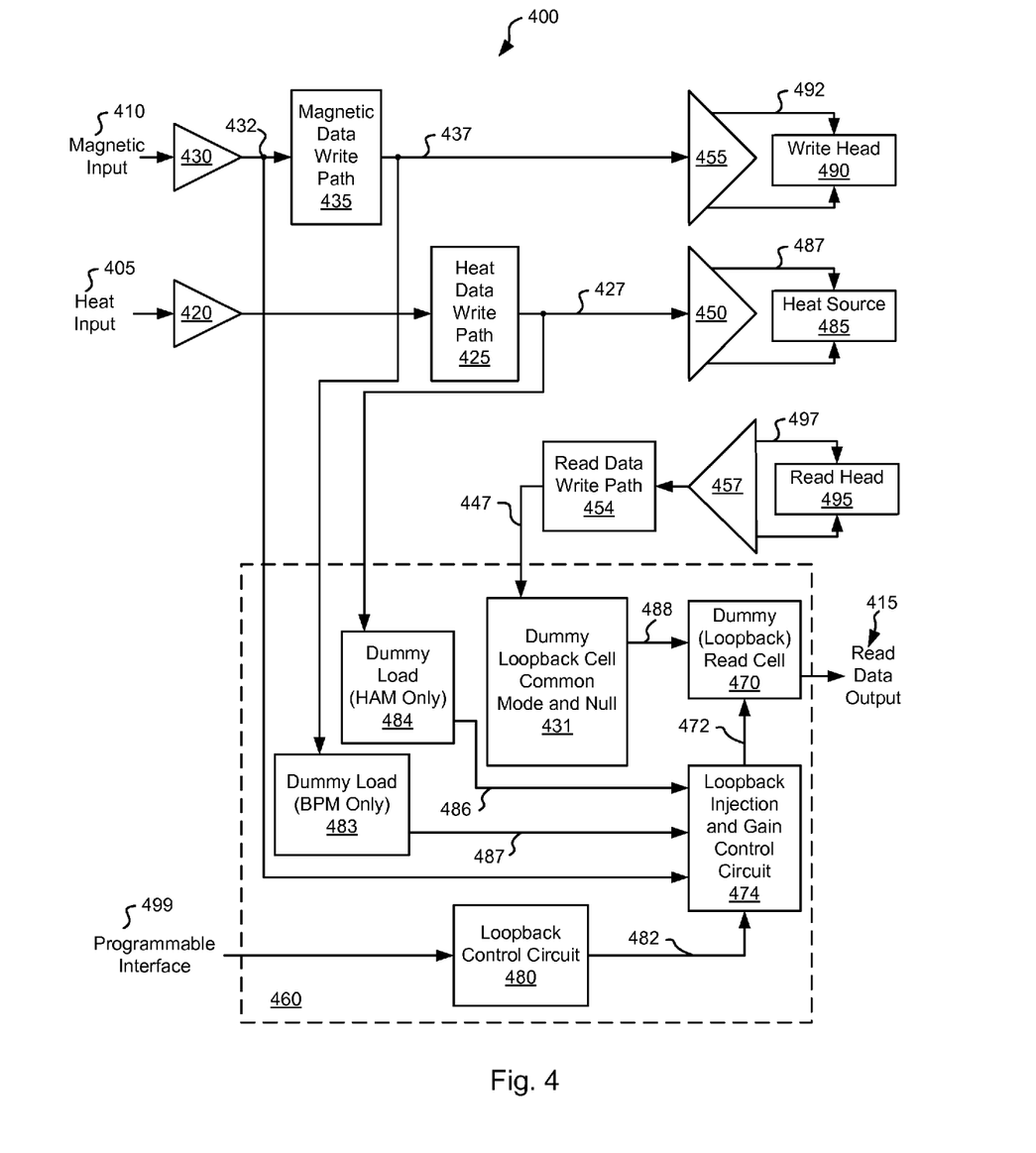
FIG. 4 shows an alternative implementation of a preamplifier circuit that may be used in relation to various embodiments of the present invention.

Turning to FIG. 4, an alternative implementation of a preamplifier circuit 400 that may be used in relation to various embodiments of the present invention is depicted. Preamplifier circuit 400 includes an input receiver 420 receiving a heat input 405 and providing a corresponding output 427 to an output driver 450 via a heat data write path 425. Heat data write path 425 includes the various connections and/or circuitry through which heat input 405 passes in transit to output driver 450. Output driver 450 provides a corresponding differential excitation signal 487 to a heat source 485. In some cases, heat source 485 is a pulsed laser.

An input receiver circuit 430 receives a magnetic input 410 and provides an interim write output 432 that is in turn provided as an output 437 to an output driver 455 via a magnetic data write path 435. Magnetic data write path 435 includes the various connections and/or circuitry through which magnetic input 410 passes in transit to output driver 455. Output driver 455 provides a corresponding differential excitation signal 492 to a write head 490. In some cases, write head 490 is an MR head as are known in the art.

Interim write output 432, output 437, and output 427 are provided to a loopback circuit 460 that is operable to provide a selected loopback signal as a read data output 415. More particularly, Interim write signal 432 is provided to a loopback injection and gain control circuit 474. Output 437 is provided to a dummy load 483 that is used for bit patterned magnetic recording feedback. Dummy load 483 mimics the operation of output driver 455 such that an output 487 from dummy load 483 reasonably closely approximates the timing of excitation signal 492. Output 427 is provided to a dummy load 484 that is used for heat assisted magnetic recording feedback. Dummy load 484 mimics the operation of output driver 450 such that an output 486 from dummy load 484 reasonably closely approximates the timing of excitation signal 487.

A read head 495 is operable to sense information from a storage medium (not shown) and to provide a corresponding read signal 497 to an input receiver 457. Input receiver 457 provides an output 447 via a read data path 454. Read data write path 454 includes the various connections and/or circuitry through which read data passes in transit to output 447. A dummy loopback cell including common mode and null 431 operates to mimic a load expected by input receiver 457 as an output driver of the read data. Dummy loopback cell 431 provides a read output 488 to a dummy read cell 470 that drives read data output 415. Dummy read cell 470 drives read data output 415 in accordance with an injection input 472 received from loopback injection and gain control circuit 474. It should be noted that preamplifier circuit 400 may service a number of read/write head assemblies (i.e., more than one of each of heat source 485, write head 490 and read head 495).

In operation, a loopback control circuit 480 is programmed to select which of the various available signals are to be looped back as read data output 415. The selection of the particular loopback scheme is controlled by a control output 482 driven by loopback control circuit 480. Such programming may be done using a programmable interface 499 from a system controller (not shown). Loopback control circuit 480 may be, for example, a microcontroller. Based upon the disclosure provided herein, one of ordinary skill in the art will recognize a variety of circuits that may be used to implement loopback control circuit 480 in accordance with different embodiments of the present invention. Further, loopback control circuit 480 may be programmed to assure that read data output 415 remains in a linear regime over all of its gain settings.

In particular, when loopback correction is to be performed for fly-height calibration, interim write output 432 is selected and operated on by loopback injection and gain control circuit 474. In particular, loopback injection and gain control circuit 474 amplifies interim write signal 432 and a corresponding variable amplitude current mode signal is provided as injection signal 472 to drive dummy read cell 470. In turn, dummy read cell 470 drives read data output 415 with a signal corresponding to injection signal 472. In some cases, the variable gain element of loopback injection and gain control circuit 474 may be implemented using conventional techniques, such as, for example, using a current-routing long-tailed pair having a programmable variable tail current source.

Alternatively, when loopback correction is provided for time delay compensation in bit patterned magnetic recording to change the phase offset applied by variable phase shift circuit 219 of FIG. 2, output 487 is selected and operated on by loopback injection and gain control circuit 474. In particular, loopback injection and gain control circuit 474 amplifies output 487 and a corresponding variable amplitude current mode signal is provided as injection signal 472 to drive dummy read cell 470. In turn, dummy read cell 470 drives read data output 415 with a signal corresponding to injection signal 472. As a third alternative, when loopback correction is provided for time delay compensation in heat assisted magnetic recording to change the phase offset applied by variable phase shift circuit 220 of FIG. 2, output 486 is selected and operated on by loopback injection and gain control circuit 474. In particular, loopback injection and gain control circuit 474 amplifies output 486 and a corresponding variable amplitude current mode signal is provided as injection signal 472 to drive dummy read cell 470. In turn, dummy read cell 470 drives read data output 415 with a signal corresponding to injection signal 472.

Figure 5A:
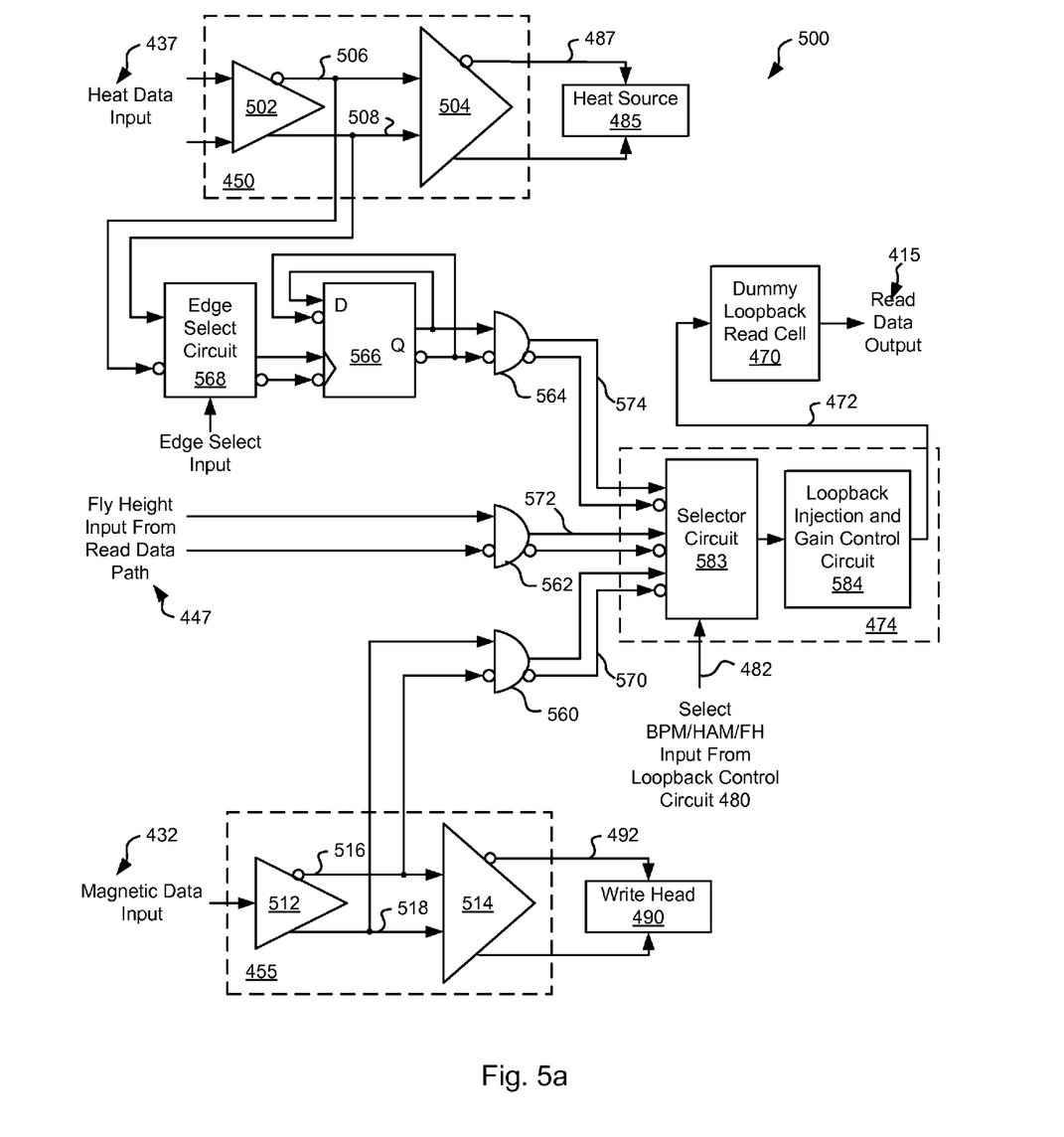
FIGS. 5a-5c are a more detailed diagram of one implementation of the preamplifier circuit of FIG. 4 in accordance with some embodiments of the present invention.

FIGS. 5a-5c show a more detailed diagram of one implementation of the preamplifier circuit 400 in accordance with some embodiments of the present invention. Turning to FIG. 5a, an overall circuit 500 includes output driver 450 that receives output 437 and drives excitation signal 487 to heat source 485. Of note, output 437 is shown as a differential signal as are other signals within output driver 450. Such a differential implementation provides an advantage of reducing propagation delays and permit polarity switching through use of differential clocking. Other implementations may use single ended technology. Output driver 450 includes a load driver 502 and an output driver 504. Load driver 502 serves a similar purpose to dummy load 484. Interim signals 506, 508 between load driver 502 and output driver 504 are provided to an edge selector circuit 568 that is controlled by an edge select input. In some embodiments, interim signals 506, 508 are tapped as near to excitation signal 487 as possible to allow for more accurate representation of the timing of excitation signal 487. Portions of output driver 450 to the right of the tap point of interim signals 506, 508 are assumed to exhibit substantially stable delays, or at least slow changing delays which can be calibrated out using multiple loopback sequences.

Edge selector circuit 568 is operable to select a polarity of heat data input 437 to use. In some cases, edge selector circuit 568 is implemented as an exclusive-or gate that allows examination of either positive or negative going edges of interim signals 506, 508 depending upon the assertion level of the edge select input. By making both positive and negative edge phase measurements in succession, the width of a laser control pulse used to drive heat source 485 (where heat source 485 is a laser) the laser control pulse can be determined if necessary. In some embodiments of the present invention, edge selector circuit 568 is implemented using differential current mode logic to reduce propagation delay and permit polarity switching through use of differential clocking.

Since heat data input 437 undergoes a complete on/off cycle in each data bit time T, were the pulse signal looped back directly it may fall outside the passband of the read data path which is customarily about ½T. Accordingly, a flip-flop 566 is configured as a divide by two counter, with the output of flip-flop 566 driving a differential AND gate 564. By performing the divide by two operation, the maximum frequency of the loopback signal corresponding to heat data input 437 is half the data rate (i.e., ½ cycle per bit time). In some embodiments of the present invention, a flip-flop 566 is implemented using differential current mode logic to reduce propagation delay and permit polarity switching through use of differential clocking.

Overall circuit 500 also includes output driver 455 that receives output 432 and drives excitation signal 492 to write head 490. Of note, output 432 is shown as a differential signal as are other signals within output driver 455. Such a differential implementation provides an advantage of reducing propagation delays and permit polarity switching through use of differential clocking. Other implementations may use single ended technology. Output driver 455 includes a load driver 512 and an output driver 514. Load driver 512 serves a similar purpose to dummy load 483. Interim signals 516, 518 between load driver 512 and output driver 514 are provided to an differential AND gate 560. In some embodiments, interim signals 516, 518 are tapped as near to excitation signal 492 as possible. Portions of output driver 455 to the right of the tap point of interim signals 516, 518 are assumed to exhibit substantially stable delays, or at least slow changing delays which can be calibrated out using multiple loopback sequences.

The fly height input 447 from the read data path is provide to a differential AND gate 562. An output 574 from AND gate 564, an output 572 from AND gate 562, and an output 570 from AND gate 560 are all provided to a selector circuit 583. Selector circuit 583 selects between the received inputs based upon a select bit 482 from loopback control circuit 480. Select bit 482 operates to select either patterned magnetic data (i.e., output 570), heat-assisted magnetic data (i.e., output 574), or fly height data (i.e., output 572) to be provided as an output to a loopback injection and gain control circuit 584. Ultimately, injection output 472 from loopback injection and gain control circuit 584 is provided to a dummy loopback read cell 470 that drives read data output 415.

Figure 5B:
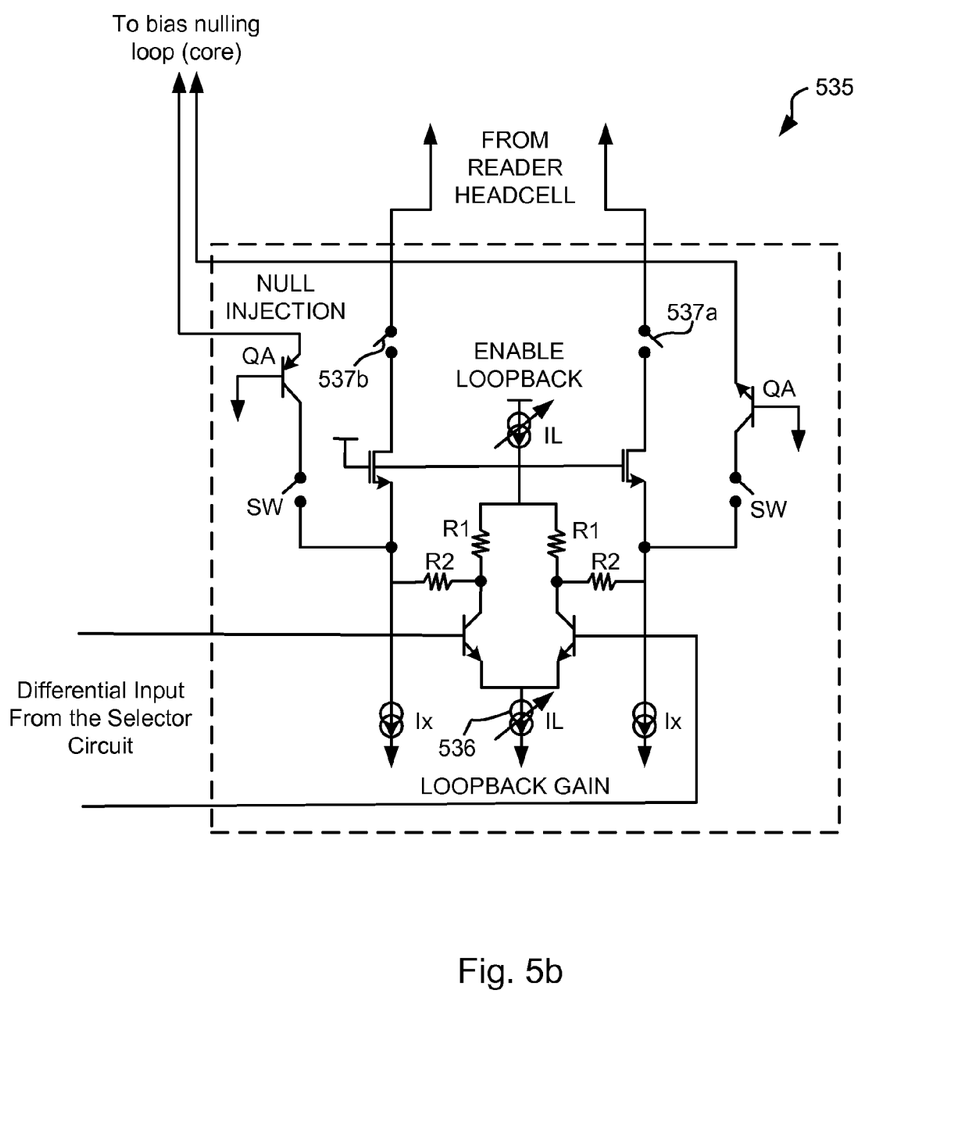

Turning to FIG. 5b, a loopback injection circuit 535 is depicted that may be used in place of loopback injection and gain control circuit 584. Loopback injection circuit 535 is implemented as a high-speed current-switched long-tailed pair having an adjustable tail current source 536. Current source 536 may be made variable in order to maintain linear read circuit operation over the full range of read gain selections. A resistive divider composed of resistors R1 and R2 attenuates the output of the current-switch pair, allowing the pair to operate at a collector current near that required to achieve maximum Ft. Further, the resistive divider also performs voltage-to-current conversion working into the source of the common-gate loopback output stage. Of note, switches 537 are used to disable the input from the read head allowing for the loopback mode where the read data output is driven by one of the selected loopback sources. Variants such as omitting switches 537 and requiring that the read head not be reading (i.e., be at zero MR bias, or be positioned over an erased region of the medium) will be apparent to one skilled in the art. Based upon the disclosure provided herein, one of ordinary skill in the art will recognize other gain and injection stages that may be used in relation to different embodiments of the present invention.

Figure 5C:
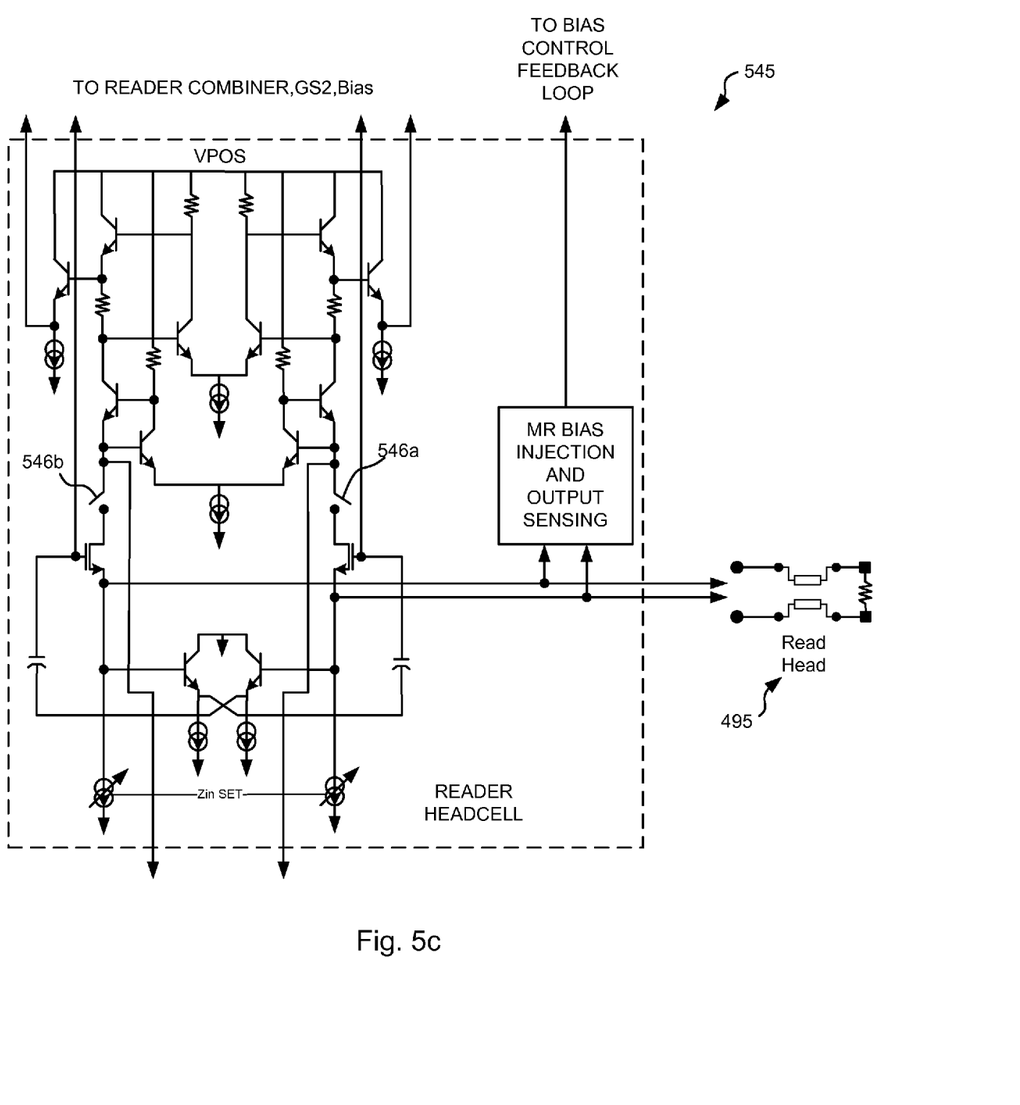

Turning to FIG. 5c, a low-noise input stage 545 is depicted that may be used in place of receiver 457 to receive reader data derived from the storage medium. Of note, the circuit would include one input stage 545 for each reader head that is deployed. Where more than one read head is deployed, only one reader head and the corresponding input stage 545 would typically be activated by a programmable port (not shown). Of note, switches 546 are used to disable the input from the read head allowing for the loopback mode where the read data output is driven by one of the selected loopback sources. Based upon the disclosure provided herein, one of ordinary skill in the art will recognize other input stages that may be used in relation to different embodiments of the present invention. For example, while input stage 545 is depicted as using a common-gate topology, other approaches are possible including, but not limited to, shunt feedback and common source/emitter.

Figure 6:
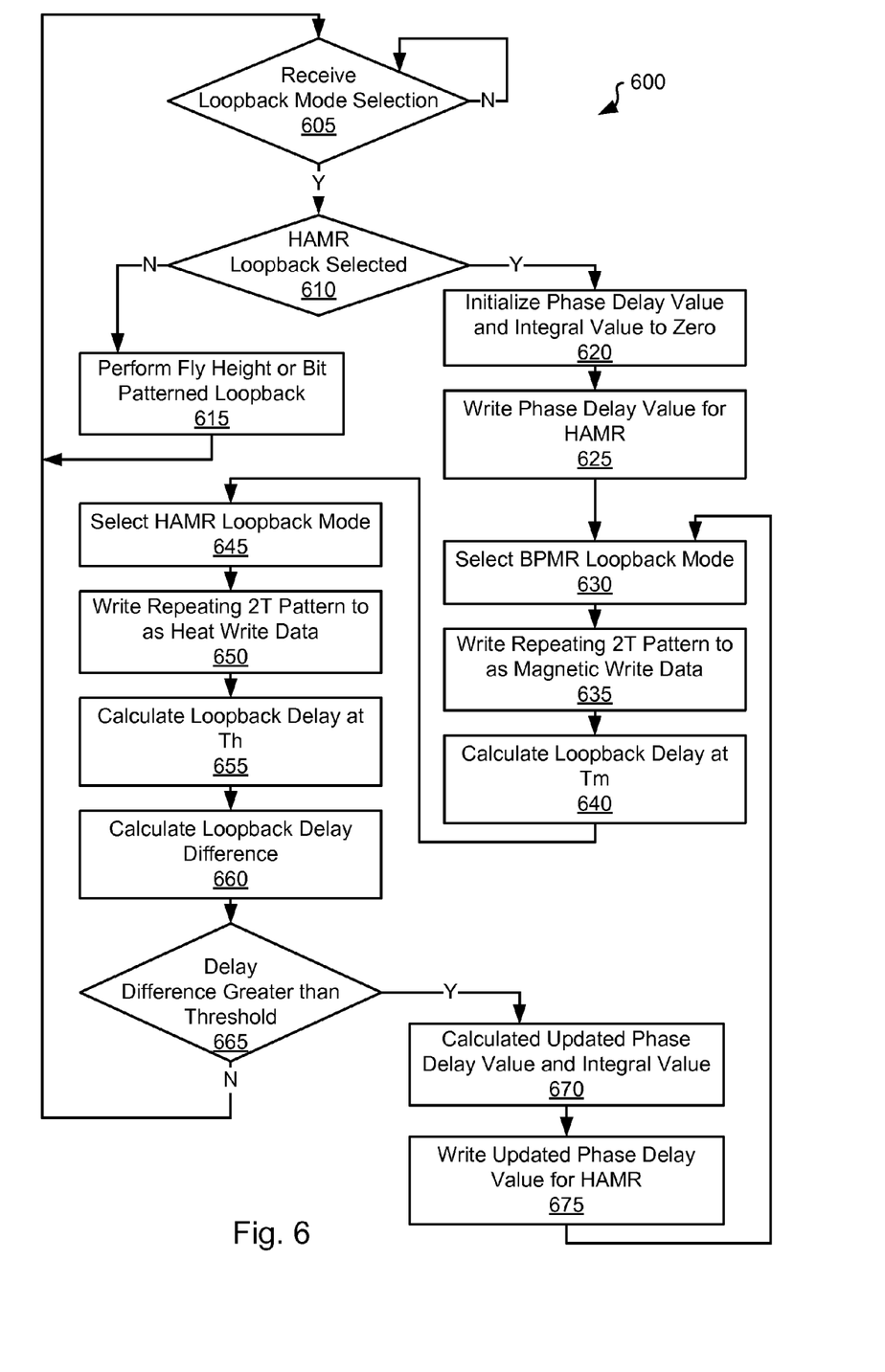
FIG. 6 is a flow diagram showing a method in accordance with some embodiments of the present invention for performing phase alignment in a recording channel.

Turning to FIG. 6, a flow diagram 600 shows a method in accordance with some embodiments of the present invention for performing phase alignment in a recording channel. Following flow diagram 600, it is determined whether one of the supported loopback modes has been selected (block 605). A loopback may be selected, for example, by controller circuit 270 writing control signals 272 to loopback controller circuit 271. It is then determined what type of a loopback control has been selected. In particular, it is determined whether heat assisted magnetic recording loopback has been selected (block 610). Where the selected loopback is other than heat assisted magnetic recording loopback or bit patterned magnetic recording loopback (block 610), a fly height calibration loopback is performed (block 615). Such a loopback may be performed similar to that described in relation to FIGS. 15-16 of U.S. patent application Ser. No. 12/838,601 entitled "Disk File Preamplifier Frequency-Response and Time Delay Compensation", and filed by Ross Jul. 19, 2010. The entirety of the aforementioned reference was previously incorporated herein by reference for all purposes.

Alternatively, where the selected loopback is heat assisted magnetic recording loopback (block 610), a phase delay value and an integral value are initialized to zero (block 620), and the phase delay value is written to the register corresponding to heat assisted magnetic recording (block 625). As an example, this may include controller circuit 270 writing a zero value to programmable phase shift value register 225. The value written to programmable phase shift value register 225 is provided as phase shift value 227 to variable phase shift circuit 220 that imposes a phase delay on the heat write data provided to the preamplifier.

The bit patterned magnetic recording loopback configuration is selected (block 630). This selection may include, for example, selecting magnetic input 310 to be fed back as read output 315. A predefined write pattern is then written as magnetic input (block 635). In some cases, the write pattern is a repeating 2T pattern (i.e., 11001100 . . . ). Based upon the disclosure provided herein, one of ordinary skill in the art will recognize a variety of patterns that may be written in accordance with different embodiments of the present invention. Writing the pattern may include, for example, writing the pattern as write data 201 to magnetic write encoder circuit. A time delay between the write data and the looped back read data is calculated (i.e., Tm) (block 640).

The heat assisted magnetic recording loopback mode is selected (block 645). This selection may include, for example, selecting heat input 305 to be fed back as read output 315. A predefined write pattern is then written as heat input (block 650). In some cases, the write pattern is a repeating 2T pattern (i.e., 11001100 . . . ). Based upon the disclosure provided herein, one of ordinary skill in the art will recognize a variety of patterns that may be written in accordance with different embodiments of the present invention. Writing the pattern may include, for example, writing the pattern as write data 201 to magnetic write encoder circuit. A time delay between the write data and the looped back read data is calculated (i.e., Th) (block 655).

A difference between the calculated loopback delays is calculated (block 655) in accordance with the following equation:

$$\Delta = Tm - Th.$$

It is then determined whether an absolute value of the calculated difference value is greater than a threshold value (block 660). Where the absolute value of the calculated difference value is not greater than the threshold value (block 660), the process ends as the delay imposed by the phase delay value is sufficient to align the excitation of the write head with the excitation of the heat source.

Alternatively, where the calculated difference value is greater than the threshold value (block 660), an updated phase delay value is calculated (block 670) in accordance with the following equation:

$$\text{Phase Delay Value} = -(K_p \cdot \Delta + K_1 \cdot \alpha),$$

where $K_p$ is an integral compensation coefficient and $K_1$ is a proportional compensation coefficient. In addition, an updated integral value is calculated in accordance with the following equation:

$$\alpha = \alpha + \Delta.$$

The updated phase delay value is then written to the register corresponding to heat assisted magnetic recording (block 675). As an example, this may include controller circuit 270 writing a the updated phase delay value to programmable phase shift value register 225. The value written to programmable phase shift value register 225 is provided as phase shift value 227 to variable phase shift circuit 220 that imposes a phase delay on the heat write data provided to the preamplifier. With this updated phase delay value thus programmed, the processes of blocks 630-675 are repeated.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data storage. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A heat assisted loopback circuit, the circuit comprising:
   a read circuit operable to sense data from a storage medium, and to provide the sensed data as a read output;
   a magnetic write circuit operable to provide a write output corresponding to an excitation signal of a write head;
   a heat write circuit operable to provide a heat output corresponding to an excitation signal of a heat source; and
   a loopback circuit operable to selectively couple a derivative of the heat output to the read output and to selectively couple a derivative of the write output to the read output.

2. The circuit of claim 1, wherein the loopback circuit comprises:
   a variable gain element operable to provide a variable current output to an output buffer, wherein the variable current output varies based at least in part on the write output when the derivative of the write output is selectively coupled to the read output by the loopback circuit, and wherein the derivative of the write output is the variable current output.

3. The circuit of claim 1, wherein the loopback circuit comprises:
   a variable gain element operable to provide a variable current output to an output buffer, wherein the variable current output varies based at least in part on the heat output when the derivative of the heat output is selectively coupled to the read output by the loopback circuit, and wherein the derivative of the heat output is the variable current output.

4. The circuit of claim 1, wherein the loopback circuit comprises:
   a variable gain element operable to provide a variable current output to an output buffer; and
   a selector circuit operable to connect at least one of the heat output and the write output to the variable gain element.

5. The circuit of claim 1, wherein the loopback circuit comprises:
   a variable gain element operable to provide a variable current output to an output buffer, wherein the variable gain element includes a current routing long tailed pair.

6. The circuit of claim 1, wherein the heat source is a laser.

7. The circuit of claim 1, wherein the write is a magneto resistive write head.

8. The circuit of claim 1, wherein the circuit is implemented as an integrated circuit.

9. The circuit of claim 1, wherein the circuit is implemented as part of a magnetic storage device.

10. A storage device, the storage device comprising:
    a storage medium;
    a read/write head assembly disposed in relation to the storage medium, wherein the read/write head assembly includes:
      a read head;
      a write head;
      a heat source;
    a preamplifier circuit including:
      a read circuit operable to receive data from the read head, and to provide the data from the read head as a read output;
    a magnetic write circuit operable to provide a write output corresponding to an excitation signal of the write head;
    a heat write circuit operable to provide a heat output corresponding to an excitation signal of the heat source; and
    a loopback circuit operable to selectively couple a derivative of the heat output to the read output and to selectively couple a derivative of the write output to the read output.

11. The storage device of claim 10, wherein the heat source is a laser, and wherein the write head is a magneto resistive write head.

12. The storage device of claim 10, wherein the loopback circuit comprises:
    a variable gain element operable to provide a variable current output to an output buffer;
    wherein the variable current output varies based at least in part on the write output when the derivative of the write output is selectively coupled to the read output by the loopback circuit, and wherein the derivative of the write output is the variable current output; and
    wherein the variable current output varies based at least in part on the heat output when the derivative of the heat output is selectively coupled to the read output by the loopback circuit, and wherein the derivative of the heat output is the variable current output.

13. The storage device of claim 10, wherein the loopback circuit comprises:
a variable gain element operable to provide a variable current output to an output buffer; and
a selector circuit operable to connect at least one of the heat output and the write output to the variable gain element.

14. The storage device of claim 10, wherein the loopback circuit comprises:
a variable gain element operable to provide a variable current output to an output buffer, wherein the variable gain element includes a current routing long tailed pair.

15. A data write system, the system comprising:
a magnetic write circuit operable to provide a write output corresponding to an excitation signal of a write head;
a heat write circuit operable to provide a heat output corresponding to an excitation signal of a heat source; and
a loopback circuit operable to selectively couple a derivative of the heat output to a read output and to selectively couple a derivative of the write output to the read output.

16. The system of claim 15, wherein the system further comprises:
a read circuit operable to sense data from a storage medium, and to provide the sensed data as the read output.

17. The system of claim 15, wherein the loopback circuit comprises:
a variable gain element operable to provide a variable current output to an output buffer, wherein the variable current output varies based at least in part on the write output when the derivative of the write output is selectively coupled to the read output by the loopback circuit, and wherein the derivative of the write output is the variable current output.

18. The system of claim 15, wherein the loopback circuit comprises:
a variable gain element operable to provide a variable current output to an output buffer, wherein the variable current output varies based at least in part on the heat output when the derivative of the heat output is selectively coupled to the read output by the loopback circuit, and wherein the derivative of the heat output is the variable current output.

19. The system of claim 15, wherein the loopback circuit comprises:
a variable gain element operable to provide a variable current output to an output buffer; and
a selector circuit operable to connect at least one of the heat output and the write output to the variable gain element.

20. The system of claim 15, wherein the loopback circuit comprises:
a variable gain element operable to provide a variable current output to an output buffer, wherein the variable gain element includes a current routing long tailed pair.

* * * * *